United States Patent [19]

Deckys et al.

[11] Patent Number: 5,600,766
[45] Date of Patent: Feb. 4, 1997

[54] METHOD AND APPARATUS FOR STORING AND DISPLAYING A POWER-ON GRAPHICAL IMAGE

[75] Inventors: David J. Deckys, Sunnyvale, Calif.; Bharat Khatri, Boca Raton, Fla.; George Mathew, Wellington, Fla.; Stanley L. Merkin, Lake Worth, Fla.; Kenneth D. Smeltzer, Austin, Tex.; Gary A. Vaiskauckas, Boca Raton, Fla.

[73] Assignee: International Business Machines Corporation, Armonk, N.Y.

[21] Appl. No.: 295,344

[22] Filed: Aug. 24, 1994

[51] Int. Cl.⁶ .................................................. G06F 15/00
[52] U.S. Cl. ................................................. 395/135
[58] Field of Search .......................... 395/135, 139, 395/133; 345/114, 127, 132

[56] References Cited

U.S. PATENT DOCUMENTS 5,404,429 4/1995 Shirasaka .............................. 395/135
5,428,724 6/1995 Silverbrook ........................... 395/135

*Primary Examiner*—Phu K. Nguyen
*Attorney, Agent, or Firm*—Anthony N. Magistrale

[57] ABSTRACT

In a computer system including a video subsystem, a method for storing and displaying a power on graphical image, comprises the steps of: storing a compressed graphical image in a programmable read-only memory (PROM); initializing a power-on self test (POST); decompressing the compressed graphical image;loading the decompressed graphic image into a random access memory (RAM); and displaying the graphical image during the POST. Also in accordance with another aspect of the invention, a method for adding a user selected graphic image to a system ROM image, comprises the steps of: searching the Flash image file for the graphical image signature (GIS); locating the actual graphical image data with the graphical image header; reading the new graphical image data; overlaying the old graphical image data into a Flash image file; and recalculating the system ROM checksum.

2 Claims, 2 Drawing Sheets

METHOD AND APPARATUS FOR STORING AND DISPLAYING A POWER-ON GRAPHICAL IMAGE

BACKGROUND OF THE INVENTION

The invention relates to information processing apparatus and more specifically to personal computer systems.

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard, or system planar, to electrically connect these components together. These systems are designed primarily to give independent computing capability to a single user and are inexpensively priced for purchase by individuals or small businesses. Examples of such personal computer systems are IBM's PERSONAL COMPUTER XT and AT and IBM's PERSONAL SYSTEM/2 Models 25, 30, 35, 40, 50, 55, 56, 57, 60, 65, 70, 80, 90, and 95.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 80. Many Family I models have used the popular INTEL 8088 or 8086 microprocessor as the system processor. These processors have the ability to address one megabyte of memory. Certain Family I and most Family II models typically use the high speed INTEL 80286, 80386, 80486, and Pentium microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors.

When the PS/2 system is turned on the user is confronted with a blank screen and eventually a flashing cursor. Today's PS/2 POST takes at least 30 seconds to execute from power-on to the start of the operating system. If POST does not detect any errors, the blank screen is displayed throughout the entire duration of POST. If POST detects an error, a corresponding error message is displayed on the screen. All error messages and information from the system POST are displayed in text mode. Additionally, error messages and information from Microchannel adapters are also displayed in text mode When an IBM PS/2 computer is turned on, the Power-On Self Test (POST) program begins execution. POST is primarily responsible for testing and initializing the PS/2 computer. Today, the user is presented with a blank screen until POST has completed and the operating system takes over control of the system. It is desirable to display a graphical image, such as the IBM logo, during POST instead of a blank screen. A method is needed to display a POST graphical image.

It is difficult to store a graphical image of any size into the space constrained "system ROM". A 640×320 graphical image stored in the standard 16-color BMP format is approximately 100,000 bytes in size. A method is needed to store the POST graphical image in the "system ROM".

POST has been written to display all error and information messages in videotext mode 3. System POST and adapter POS display all messages via video BIOS, Interrupt 10 Hex. A method is needed for system POST to display error messages in a manner that is compatible with graphical image. A method is also needed for system POST to display text information on the same screen as the graphical image.

System POST gives control over to each installed Microchannel adapter during adapter ROM scan. Adapter POST is contained on the adapter itself and cannot be modified. A method is needed for adapter POST to display adapter text information in a manner that is compatible with a graphical image.

It is desirable to display the POST graphical image as early as possible during POST. Retrieving the graphical image data from the disk is not possible since the SCSI disk subsystem is not tested and initialized until the end of POST. The POST Building Block method of testing the computer system prohibits moving the SCSI disk subsystem initialization to the beginning of POST. Therefore, the graphical image must be stored in the "system ROM". The size of a graphical image is very large relative to the available space in the "system ROM". A method is needed to store a large graphic image within the confines of a tight "system ROM".

In addition, when and IBM PS/2 computer is turned on, the Power-On Self Test (POST) program begins execution. POST is primarily responsible for testing and initializing the PS/2 computer. POST displays a graphical image, usually the IBM logo, while executing. It would be desirable to give the user the ability to change the POST graphical image. A method is needed to install a new POST graphical image on the PS/2 system.

The ability to install a new graphical image allows the user to individualize the PS/2 computer. Because of the flash technology and advanced security features of the PS/2, it is impossible to replace the graphical image without a privileged access password. A method is needed to allow the PS/2 user to easily install a new POST graphical image.

SUMMARY OF THE INVENTION

Briefly, in accordance with the invention in a computer system including a video subsystem, a method for storing and displaying a power on graphical image, comprises the steps of:

storing a compressed graphical image in a programmable read-only memory (PROM);

initializing a power-on self test (POST);

decompressing the compressed graphical image;

loading the decompressed graphic image into a random access memory (RAM); and displaying the graphical image during the POST.

Also in accordance with another aspect of the invention, a method for adding a user selected graphic image to a system ROM image, comprises the steps of:

searching the Flash image file for the graphical image signature (GIS);

locating the actual graphical image data with the graphical image header;

reading the new graphical image data;

overlaying the old graphical image data into a Flash image file; and recalculating the system ROM checksum.

BRIEF DESCRIPTION OF THE DRAWING(S)

DESCRIPTION OF THE ILLUSTRATIVE EMBODIMENT(S)

Figure 1:
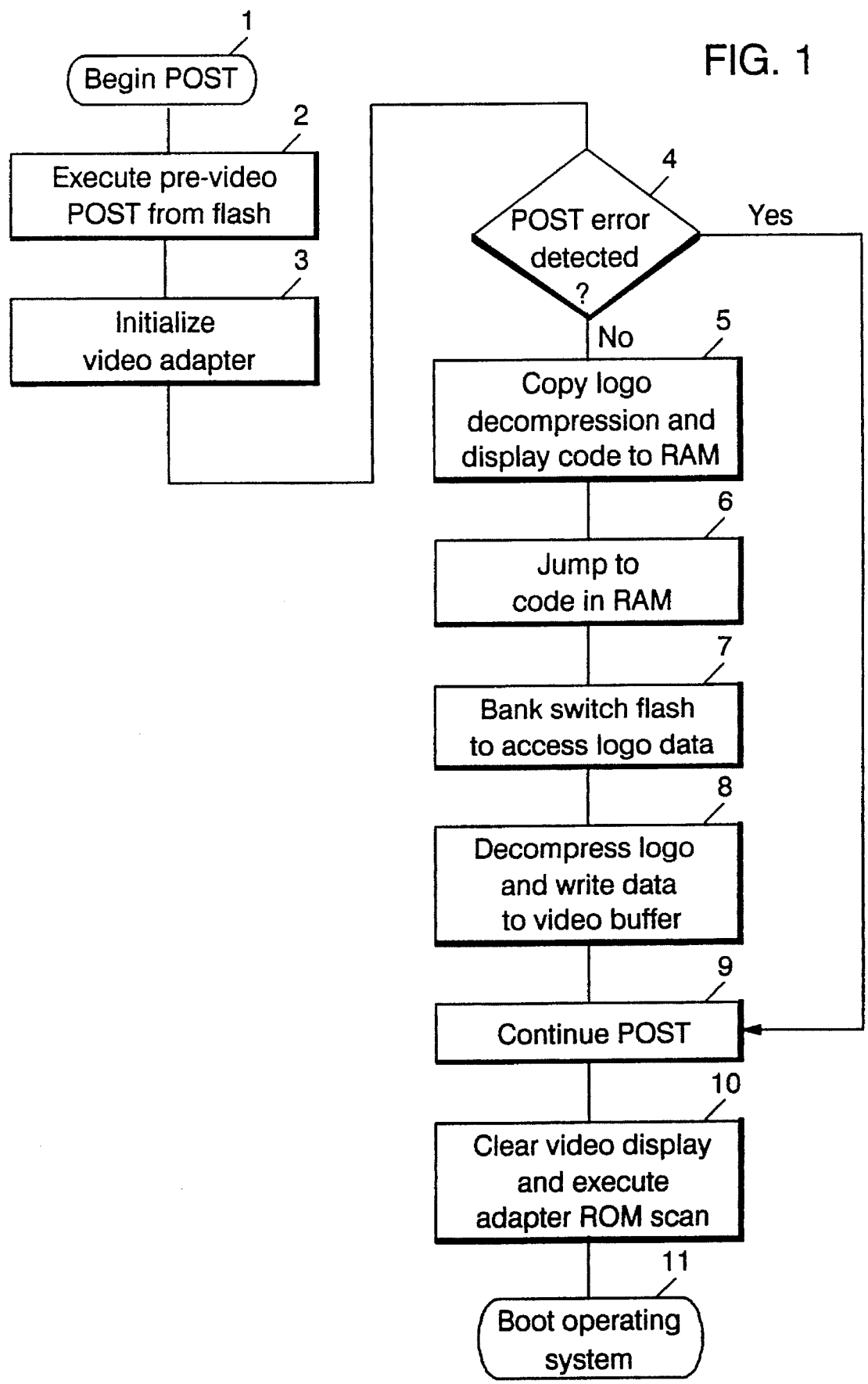
FIG. 1 is a flowchart for a method of storing and displaying a power-on graphical image.

In the past PS/2 POST has initialized the video subsystem to video text mode 3 before displaying error and information messages. Video BIOS uses the 9×16 font table to display text in video mode 3. To display the POST graphical image, the new POST will initialize the video subsystem to video graphics mode 12 hex, 640×480 resolution. During video mode 12 hex initialization, video BIOS switches the font pointer to the 8×8 font table. Consequently video BIOS is able to display 8×8 font characters in video mode 12 hex. Thus it is possible to display text in video mode 12 hex using standard video BIOS interrupts. Therefore POST is able to easily display text information on the same screen as the graphical image.

If the graphical image is being displayed when system POST displays an error message then the text will overlay the graphical image, and possibly cause the graphical image to scroll upwards. System POST will clear the screen before the first error message is displayed. Subsequent error messages will follow previous error messages without clearing the screen. After the user has corrected all error conditions, POST will display the graphical image until adapter ROM scan, which occurs towards the end of POST.

Adapter ROM's contain POST code that is executed during adapter ROM scan. During adapter POST, the adapter owns the screen and is allowed to display errors and other information via the video BIOS interrupt. In order to avoid this problem, POST will clear the screen before the adapter ROM scan. Since the adapter ROM scan is executed towards the end of POST, clearing the screen at this point is acceptable. The screen will not be cleared before ROM scan if system POST has already displayed an error message.

In order to store a graphical image into the "system ROM", the graphical image data must be compressed. A utility will be provided to compress the graphical image data to a size that will fit into the "system ROM". The utility can use any compression algorithm to shrink the data.

During the early stages of POST, the graphical image data will be read from the "system ROM", decompressed, and displayed on the monitor. The POST decompression routine will use the reverse of the compression algorithm used by the compression utility.

In accordance with another aspect of the invention, a utility will be provided that will update the "system ROM" with a new POST graphical image. The user may create a new graphical image using a paint program. The utility will require two files: A flash image file of the "system ROM", and the new graphical image in compressed form.

First the utility will search the flash image file for the graphical image signature. The graphical image signature is part of the graphical image header. The graphical image header is a data record in the "system ROM" which contains the location of the graphical image, the graphical image signature, the maximum allowable size of the graphical image, and other information. After the utility finds the graphical image signature, the graphical image header is used to locate the actual graphical image data. The utility will read the new graphical image data and overlay the old graphical image date in the flash image file. Finally, the utility will recalculate the "system ROM" checksum.

The user can then perform a flash update on the PS/2 system with the flash file containing the new graphical image. The next time the PS/2 is turned on, the new graphical image will be displayed.

Referring to FIG. 1 there is shown a flowchart for a method of storing and displaying a power-on graphical image. In step 1, POST begins. Next, in step 2, pre-video POST is executed from flash storage. Then in step 3, the video adapter is initialized. A decision 4 is then made on whether a POST error is detected. If it is, then step 9 follows. If decision 4 is negative then step 5 copies logo decompression and display code to RAM. In step 6, the process jumps to code in RAM. Then according to step 7 bank switch flash to to access logo data. In step 8, the logo is decompressed and the data is written to video buffer. POST continues in step 9 and in step 10 the video display is cleared and the adapter ROm scan is executed. Finally, in step 11 the operating system is booted.

Figure 2:
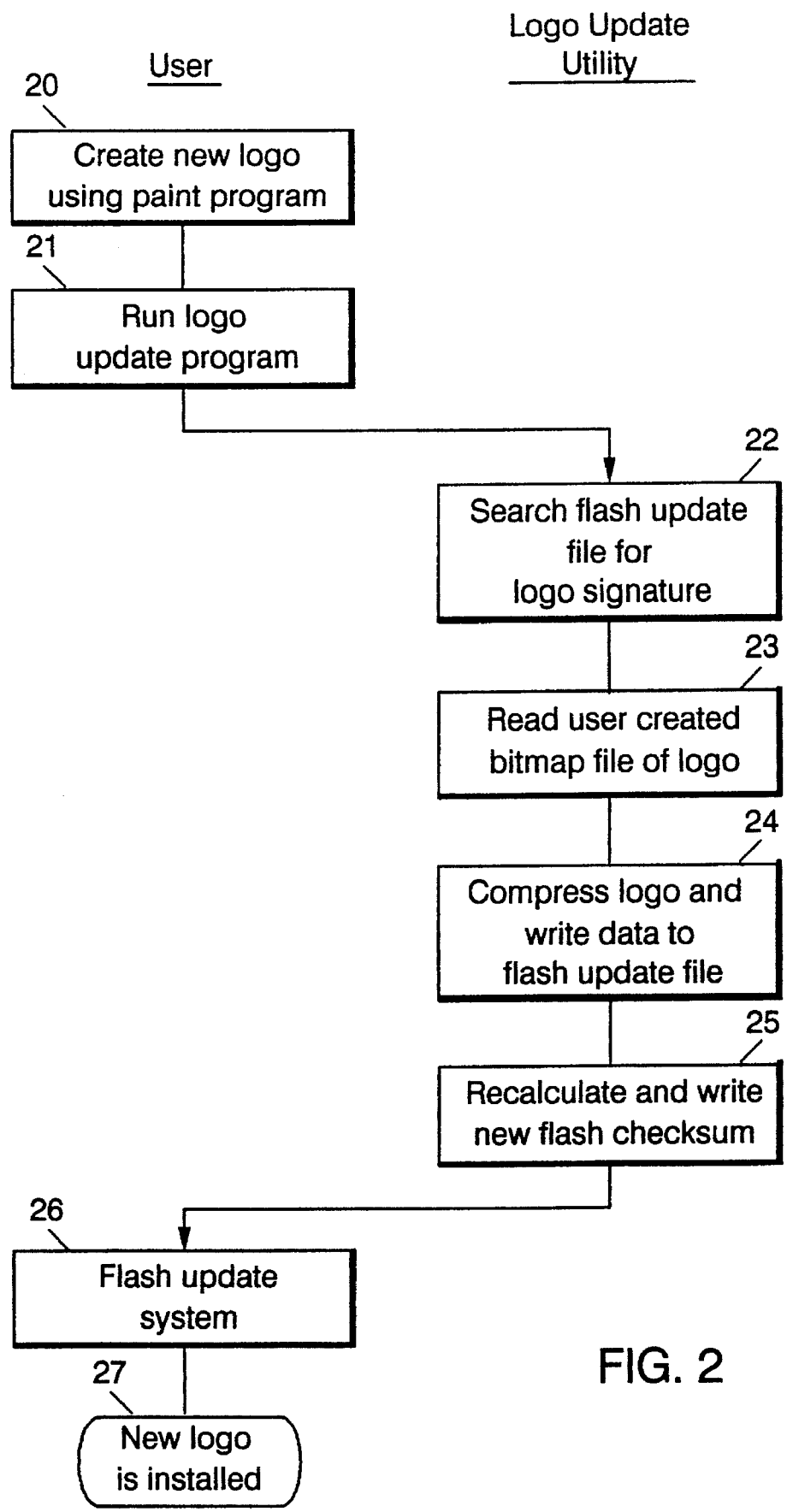
FIG. 2 is a flowchart for a method of installing a new power-on graphical image.

Referring to FIG. 2 there is shown a flowchart for a method of storing and displaying a new power-on graphical image. Under step 20 a new graphic image or logo is created using a Paint program. Then a logo update program is run (step 21). In step 22 a flash update file is searched for for the signature of the logo. In step 23, a user created bitmap file of the logo is read from storage. Then step 24 compresses the logo and write data to a flash update file. Step 25 recalculates and writes a new flash checksum. Step 26 flash updates the system. Finally, the new logo is installed in step 27.

What is claimed is:

1. In a computer system including a video subsystem, a method for storing and displaying a power on graphical image, comprising the steps of:

(a) storing a compressed graphical image in a programmable read-only memory (PROM);

(b) initializing a power-on self test (POST);

(c) decompressing the compressed graphical image;

(d) loading the decompressed graphic image into a random access memory (RAM); and (e) displaying the graphical image during the POST.

2. A method for adding a user selected graphic image to a system ROM image, comprising the steps of:

searching the Flash image file for the graphical image signature (GIS);

locating the actual graphical image data with the graphical image header;

reading the new graphical image data;

overlaying the old graphical image data into a Flash image file; and recalculating the system ROM checksum.

* * * * *

(12) EX PARTE REEXAMINATION CERTIFICATE (7562nd)

United States Patent
Deckys et al.

(10) Number: US 5,600,766 C1
(45) Certificate Issued: Jun. 22, 2010

(54) METHOD AND APPARATUS FOR STORING AND DISPLAYING A POWER-ON GRAPHICAL IMAGE

(75) Inventors: David J. Deckys, Sunnyvale, CA (US); Bharat Khatri, Boca Raton, FL (US); George Mathew, Wellington, FL (US); Stanley L. Merkin, Lake Worth, FL (US); Kenneth D. Smeltzer, Austin, TX (US); Gary A. Vaiskauckas, Boca Raton, FL (US)

(73) Assignee: Lenovo (Singapore) Pte Ltd., Singapore (SG)

Reexamination Request:
No. 90/010,355, Dec. 23, 2008

Reexamination Certificate for:
Patent No.: 5,600,766
Issued: Feb. 4, 1997
Appl. No.: 08/295,344
Filed: Aug. 24, 1994

(51) Int. Cl.
*G09G 5/00* (2006.01)

(52) U.S. Cl. ...................................................... 345/641
(58) Field of Classification Search .................. None
See application file for complete search history.

(56) References Cited

U.S. PATENT DOCUMENTS 4,439,804 A * 3/1984 Riddle et al. .................. 361/92

4,622,545 A 11/1986 Atkinson

OTHER PUBLICATIONS

Rose, Caroline et al; Inside Macintosh vol. 1–vol. VI; pp. II–357 to II–363. III–42, IV–255 to IV–257, V–347 to V356, 13–10 to 13–11, and 16–15 to 16–19; 1985.

Meadow, Anthony; Macintosh Inside Out—System 7 Revealed; pp. xxiii–xxxvi, 1–36, 261–280, and 325–329; 1991.

* cited by examiner

*Primary Examiner*—William H. Wood

(57) ABSTRACT

In a computer system including a video subsystem, a method for storing and displaying a power on graphical image, comprises the steps of: storing a compressed graphical image in a programmable read-only memory (PROM); initializing a power-on self test (POST); decompressing the compressed graphical image; loading the decompressed graphic image into a random access memory (RAM); and displaying the graphical image during the POST. Also in accordance with another aspect of the invention, a method for adding a user selected graphic image to a system ROM image, comprises the steps of: searching the Flash image file for the graphical image signature (GSI); locating the actual graphical image data with the graphical image header; reading the new graphical image data; overlaying the old graphical image data into a Flash image file; and recalculating the system ROM checksum.

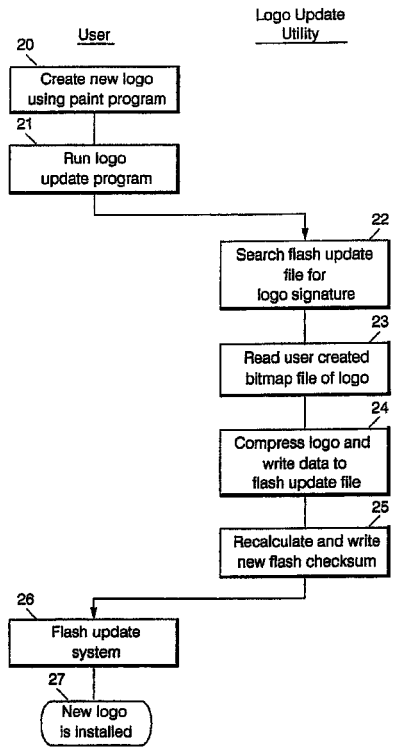

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 2 is confirmed.

\* \* \* \* \*